Figure 1:
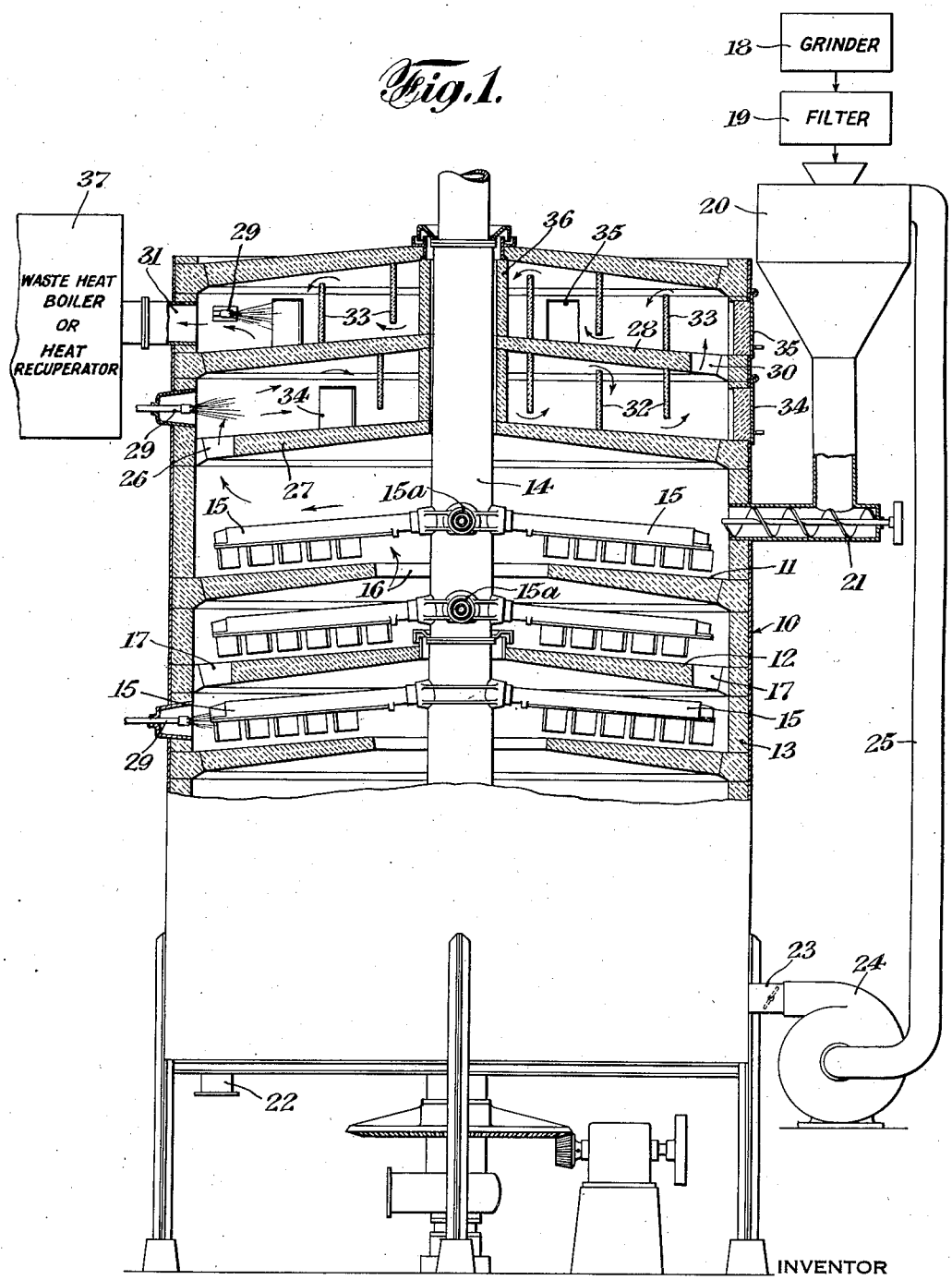

Dec. 8, 1936.  F. B. SCHILLING  2,063,630
DRYING AND INCINERATING OF SEWAGE, GARBAGE, ETC
Original Filed April 7, 1933   2 Sheets-Sheet 1

INVENTOR
Frederick B. Schilling
BY
Ward, Crosby & Neal
ATTORNEYS

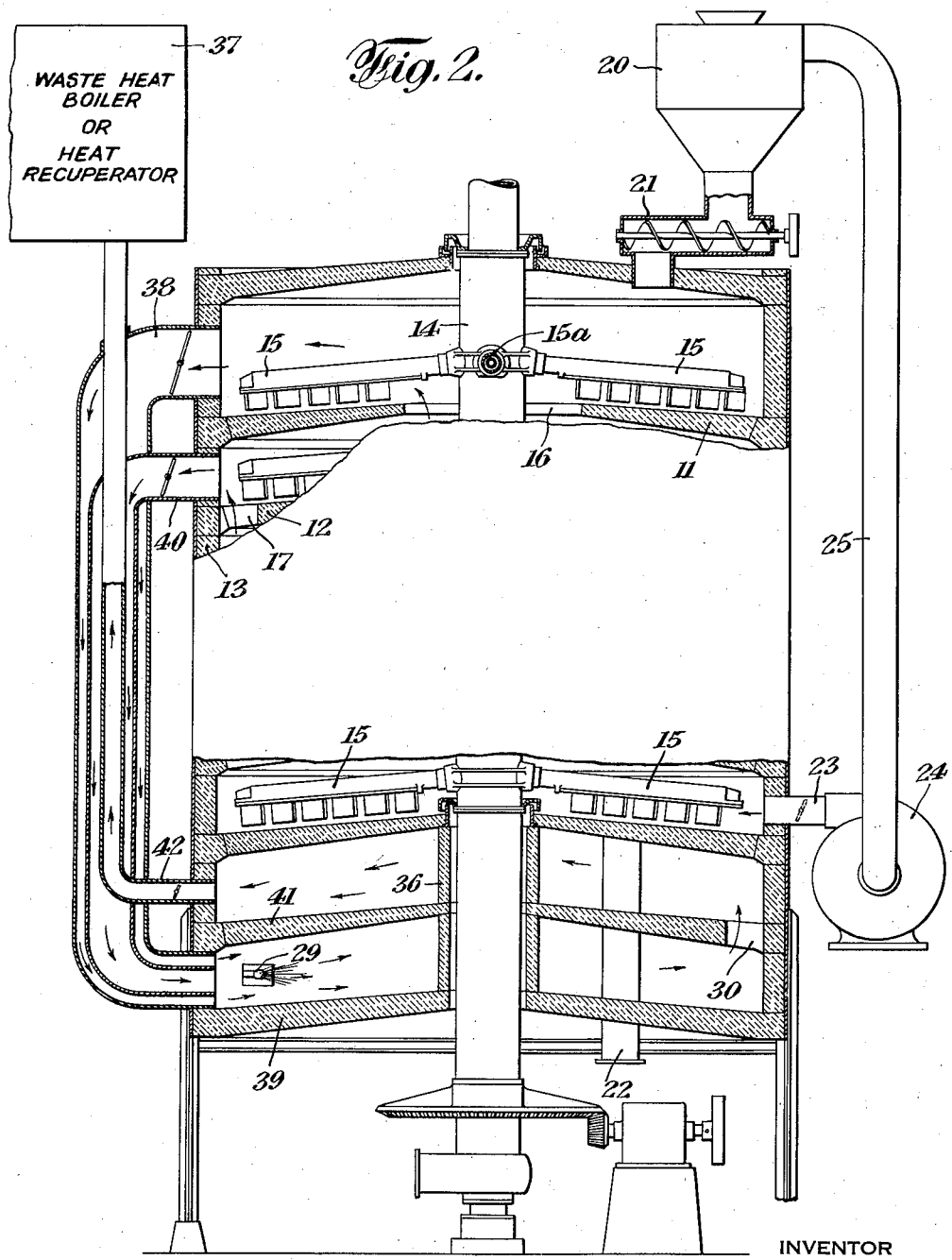

Patented Dec. 8, 1936

2,063,630

UNITED STATES PATENT OFFICE 2,063,630

DRYING AND INCINERATING OF SEWAGE, GARBAGE, ETC.

Frederick B. Schilling, Bayside, N. Y., assignor to Nichols Engineering & Research Corporation, New York, N. Y., a corporation of Delaware Application April 7, 1933, Serial No. 664,884
Renewed July 11, 1936

15 Claims. (Cl. 110—15)

This invention relates to a process and apparatus for treating and burning waste materials such as sewage, garbage and trash, and the elimination of obnoxious odors from the gases evolved from the material during its treatment.

The invention provides an improved process and apparatus for efficiently and rapidly burning or drying such material, incinerating or burning the dried material, and eliminating by the use of heat the obnoxious odors from gases produced during the process.

Various further and more specific objects, features and advantages will clearly appear from the detailed description given below, taken in connection with the accompanying drawings which form a part of this specification and illustrate, merely by way of example, various embodiments of the apparatus of the invention.

The invention consists in such novel features, arrangements and combinations of parts as may be shown and described in connection with the furnace arrangements herein disclosed, by way of example only, and as illustrative of preferred embodiments, together with such novel methods and steps of processes as may also be described herein.

In the drawings, Fig. 1 illustrates partly in section, furnace apparatus for drying and incinerating the material and for treating the gases to eliminate odors therefrom; and Fig. 2 is a view similar to Fig. 1, but illustrating an alternative embodiment of the apparatus.

In Fig. 1 a multiple hearth furnace of the Herreshoff type is indicated at 10 having a plurality of superposed hearths as at 11 and 12, etc., surrounded and supported by the usual furnace wall structure as at 13. A central rotatable shaft 14 may be provided with radially extending rabble arms as at 15 for rabbling the material over each of the hearths in succession down through the furnace. Each of the hearths is provided with gas ports, hearth 11 for example being provided with a central port or opening 16, and hearth 12 with several peripheral ports or openings as at 17—succeeding alternate hearths respectively being provided with central and peripheral openings or ports, whereby the gases evolved from the material under treatment are permitted to pass upwardly through the furnace countercurrent to the path of travel of the material.

The material to be treated may be first preferably ground to break up large pieces, as in a grinder schematically indicated at 18, and then passed through a filter 19 to remove such quantities of moisture as may be readily disposed of in that way. Then the material may be fed into a hopper 20, thence by a screw conveyor 21 or other suitable conveying means into the space above hearth 11. The material will fall upon the hearth 11 and will be rabbled upon this hearth until it drops through the opening 16 down to the succeeding hearths. On the hearth 12 and on the succeeding hearths, the material is efficiently and uniformly dried and incinerated, the heat of combustion of the material being utilized for this purpose and supplemented to the extent necessary, depending upon the character of the material, by oil burners or other heating means applied at the middle or lower hearths. The rabbling of the material over the succeeding hearths insures uniform and rapid treatment, with the result that it is reduced to a rather finely divided ash, which may be passed out through an outlet 22 at the bottom of the furnace.

The conveying means for feeding the material into the furnace is preferably made of such a type that gases arising from the material being roasted in the furnace, cannot escape through the conveyor. For example, the screw conveyor as shown is luted by the material itself as it is fed into the furnace. Thus the possibility of gases escaping at this point is avoided so that all of the gases evolving obnoxious odors will be required to pass through treating means hereinafter described, before they are permitted to escape to the atmosphere.

Sufficient air to insure thorough combustion of the material may be introduced, for example, into the space over one of the lower hearths, through an air inlet pipe as at 23. If desired, such air may be drawn as by means of a blower 24 through a conduit 25 communicating with the space above the waste material in the hopper 20. This arrangement will substantially eliminate the escape of odoriferous gases into the plant from the waste material in the hopper. That is, with this method, fresh air will be drawn into the mouth of the hopper, thereby preventing escape of odors from the hopper, and any gases which tend to form in the hopper will be drawn with the fresh air through the conduits 25 and 23 into the furnace. The amount of air thus admitted to the furnace may be adjusted as by means of a damper in the conduit 23.

The gases evolved from the material under treatment in the furnace may pass upwardly through the furnace over the several hearths and through the ports thereof, and finally to the space above the hearth 11. It will be noted that the space above hearth 11 is made substantially higher than the space above the lower hearths. By thus making this space somewhat larger, the flow of gases therethrough will be slower and less turbulent, so that a considerable proportion of the dust and ash carried by the gases will settle out and fall on hearth 11 and become mixed with the moist incoming material.

The gases finally pass out of the space above hearth 11 through an opening 26 formed in a hearth 27 near the top of the furnace. While the odoriferous content of some of the gases evolved from the incinerated material may be burned during the travel of the gases over the hearths where incineration occurs, yet a considerable quantity of such gases involving troublesome odors will be evolved at the upper hearths and it is therefore important to treat such gases for the elimination of odors before the gases are expelled to the atmosphere. For this purpose the gases may be subjected to a relatively high temperature, as for example from 1300 to 1400° F. or higher with sufficient air to insure decomposition and burning of the odoriferous content of the gases with the consequent substantial elimination of obnoxious odors therefrom. This temperature may be readily secured in the space above hearth 27 and also if desired, in the space above an additional hearth 28, by introducing one or more oil burners as at 29 into such spaces. In some cases it is desirable to subject these gases to such a high temperature for a substantial interval of time to insure that all of the gas will be raised to the proper temperature to eliminate the odors. To this end the gases may be admitted to the chamber above hearth 27 through the opening 26 at one side of the furnace, from which they are required to pass over the greater part of the area of the hearth 27 to the other side of the furnace, where they may pass through an opening 30 into the chamber above hearth 28. Preferably also the outlet 31 from the space above hearth 28 is located at the opposite side of the furnace from the opening 30. If desired, in order to further insure settlement of dust and ash from the gases, these chambers may be provided respectively with a series of baffles as at 32 and 33 and the dust may be removed from these chambers through doors as at 34 and 35. In order to protect the portions of the furnace shaft 14 from the effect of the high temperatures in the chambers above hearths 27 and 28, such portions of the shaft may be provided with coverings of refractory material as at 36.

Since the relatively moist material passing over hearths 11 and 12 will be quite bulky, an additional number of rabble arms may be used over these hearths. With the more common practice in such furnaces, two rabble arms are used over each hearth. However, according to this process, it is preferred to use two additional rabble arms over each of these upper hearths, as indicated at 15a, and the same may be conveniently placed at right angles to the usual arms. The number of incinerating hearths, as well as the number of hearths at which high temperature treatment is given to the gases, may be varied by trial to give the most efficient results for the particular material being treated.

As to constructional features not specifically referred to herein, the usual design of furnaces of this general type may be followed; also reference may be had to the patent to Herreshoff No. 976,175, granted November 22, 1910, and the patent to Baird No. 1,669,925 of May 15, 1928.

With the obnoxious odors, dust and ash substantially eliminated from the gases, they may then pass through the outlet 31 into a suitable heat exchange device 37, such as a waste heat boiler or heat recuperator, in order that a substantial amount of the heat from these hot gases may be recovered for use in heating the plant, or the manufacture of power. From the heat exchange device, the gases may be discharged to the atmosphere through a stack, without danger of annoyance.

With the above described arrangement, the obnoxious gases laden with ash and dust may be treated with a high degree of efficiency, since the treatment is effected while the gases are still within the furnace and hence before any opportunity is afforded for the gases to become cooled with a consequent waste of heat, as would occur if the gases were treated at some point apart from the furnace. Also the treatment of the gases before they pass out of the furnace, effectively insures against the possibility of the escape into the plant of gases carrying obnoxious odors or dust. The efficiency of the process is further improved by immediately passing the hot treated gases through the heat exchange device, thus enabling the recovery of a substantial amount of the heat used in treating the gases.

The embodiment of the invention illustrated in Fig. 2 is similar to that above described, except that the chambers for treating the gases to remove obnoxious odors are arranged at the bottom of the furnace instead of at the top. Parts which otherwise correspond in the two figures are indicated with the same reference characters.

In Fig. 2 the gases may be withdrawn from the relatively large space above hearth 11, through a conduit 38 communicating with the space above the lowermost hearth 39. If desired also some of the warmer gases over the hearth 12 may be withdrawn through a conduit 40 and conducted as shown to the lower hearths. On the next to the bottom hearth 41, the treated gases may be withdrawn through a conduit 42 communicating with the heat exchange device 37. If desired, in order to substantially eliminate any wasteful radiation of heat from the conduit 42, the same may be located within the conduit 40, which in turn may be located within the conduit 38. In this way a large amount of the heat which radiates from the inner conduits will be utilized in the outer conduit to preheat the gases to partially prepare the same for their high temperature treatment in the lower hearths.

Since the material being rabbled on the top hearth or hearths, as above stated, is relatively moist, the gases withdrawn through conduit 38 will embody substantial quantities of vapor relatively cooler than the hot odoriferous gases withdrawn through conduit 40 at a lower hearth. It is advantageous to withdraw the hot odoriferous gaseous products of combustion through conduit 40 rather than allowing all of the same to pass up over the top or higher hearths, since by so doing the drying action may proceed more uniformly and to a greater extent before the waste material is subjected to the burning temperatures at the lower hearths. Thus, scorching and possible caking of the exposed surfaces of the drying material on the upper hearths may be avoided. This more uniform drying of the material on the upper hearth before burning starts, also tends to prevent creation of excessive odors difficult to destroy. The heat exchanging relationship between the conduits 38 and 40, causes relatively cooler vapors in the conduit 38 to be raised in temperature by the hot gaseous products in the conduit 40 so that when the vapors arrive at the hot region within the bottom of the furnace, they will be ready for more prompt heat treatment to eliminate the odors thereof. The preliminary heating of the vapors in conduit 38 before their entry into the heat treating spaces, insures against the occurrence of cool regions in such spaces which would be detrimental to thorough heat treatment. The passage of the heat treated vapors in conduit 42 through two heat exchanging stages, i. e., first in heat exchanging relationship with the gases of conduit 40, and finally in more direct heat exchanging relationship with the relatively cooler vapors of conduit 38, permits the heat of the hot gases of conduit 42 to be efficiently extracted before such gases leave the apparatus.

Further embodiments of apparatus and methods involving certain features of the invention are more specifically described and claimed in my copending application Ser. No. 14,988, filed April 6, 1935.

It will be apparent that with the above described invention a compact apparatus which may comprise a unitary or substantially unitary structure is provided for efficiently treating the various waste materials which are ordinarily collected at municipal disposal plants. The confining of the apparatus to a substantial unitary structure, not only insures against waste of heat and the escape of obnoxious gases and dust, but also makes possible substantial savings in the size and cost of buildings for housing the apparatus as compared with the buildings generally necessary with the prior art practices.

While the invention has been described in detail with respect to particular preferred examples, it will be understood by those skilled in the art after understanding the invention, that various changes and further modifications may be made without departing from the spirit and scope of the invention, and it is intended therefore in the appended claims to cover all such changes and modifications.

What is claimed as new and desired to be secured by Letters Patent of the United States is:

1. An incinerating furnace comprising a plurality of superposed hearths, means for feeding the material to be treated therein on to one of said hearths near the top of the furnace, means for rabbling the material over said hearth and the succeeding lower hearths from hearth to hearth down through the furnace, said rabbling means at one or more of the first hearths on which the material is fed being provided with additional means for rabbling the material faster than on the lower hearths, each of the hearths of the furnace being formed with gas ports permitting the gases arising from the material being incinerated to travel upwardly through the furnace, over the succeeding hearths and out at the top of the furnace, and means at the hearth or hearths above where the material is fed into the furnace for raising the gases to a high temperature for substantially eliminating obnoxious odors therefrom.

2. An incinerating furnace comprising a plurality of superposed hearths, means for feeding the material to be treated therein on to one of said hearths near the top of the furnace, means for rabbling the material over said hearth and the succeeding lower hearths from hearth to hearth down through the furnace, each of the hearths of the furnace being formed with gas ports permitting the gases arising from the material being incinerated to travel upwardly through the furnace, over the succeeding hearths and out at the top of the furnace, means at the hearth or hearths above where the material is fed into the furnace for raising the gases to a high temperature for substantially eliminating obnoxious odors therefrom, and baffle means at said last named hearths for causing the gases flowing thereover to take an indirect path of travel to facilitate the settling of dust and ash therefrom.

3. Apparatus for treating garbage, sewage or the like waste materials, comprising a furnace having a plurality of superposed hearths upon which the material is incinerated, means for rabbling the material over said hearths from hearth to hearth down through the furnace, additional hearths within the furnace but outside the path of travel of the waste material, each of said first named hearths being formed with gas ports located at the center and periphery respectively of alternate hearths for permitting the gases arising from the material being incinerated to travel upwardly through the furnace, means for conducting such gases from the uppermost of said first named hearths to the spaces above said additional hearths, said additional hearths also having gas ports located at substantially diametrically opposite points in succeeding adjacent hearths respectively, and means for raising the temperature of the gases within said spaces to a temperature sufficient for decomposing or burning such gases therein as have obnoxious odors.

4. Apparatus for treating garbage, sewage or the like waste materials, comprising a furnace having a plurality of superposed hearths upon which the material is incinerated, means for rabbling the material over said hearths from hearth to hearth down through the furnace, one or more additional hearths within the furnace but outside the path of travel of the waste material, each of said first named hearths being formed with gas ports permitting the gases arising from the material being incinerated to travel upwardly through the furnace, the space above the uppermost of said first named hearths being larger than the space above succeeding hearths whereby the flow of gases over said uppermost hearth will be slower and less turbulent for facilitating settling of dust and ash from the gases, means for conducting the gases from said uppermost hearth to the space above said additonal hearth or hearths, and means for raising the temperature of said gases within said last named space to a degree and for a sufficient length of time to substantially eliminate obnoxious odors from the gases.

5. Apparatus for treating garbage, sewage or the like waste materials, comprising a furnace having a plurality of superposed hearths upon which the material is incinerated, means for rabbling the material over said hearths from hearth to hearth down through the furnace, one or more additional hearths within the bottom portion of the furnace but outside the path of travel of the waste material, each of said first named hearths being formed with gas ports permitting the gases arising from the material being incinerated to travel upwardly through the furnace, means for conducting such gases from the uppermost of said first named hearths to the space above said additional hearth or hearths, and means for raising the temperature of said gases within said space to a degree and for a sufficient length of time to substantially eliminate obnoxious odors from said gases.

6. An incinerating furnace comprising a plurality of superposed hearths, means for feeding the material to be treated therein into the top of said furnace, means for rabbling the material from hearth to hearth down through the furnace, one or more additional hearths within the furnace but below the path of travel of the treated material within the furnace, means for heating said additional hearths, conduit means for conveying the gases evolved from the material under treatment from the top of the furnace to the space above said additional hearth or hearths and over said additional hearth or hearths, and means in heat interchanging relationship with said conduit means for conveying away the hot gases from said additional hearth or hearths.

7. In combination, an incinerator furnace for treating sewage, garbage or the like waste material, said furnace including a number of incinerating hearths, an additional chamber in said furnace and means for heating the same for supplying high temperature treatment to the furnace exit gases to substantially eliminate odors therefrom, conduit means extending from the furnace gas exit to said chamber, and additional conduit means leading from said chamber, the said two conduit means being arranged in heat interchanging relationship.

8. Apparatus for drying and incinerating garbage, sewage or the like waste materials, comprising a furnace having a plurality of superposed hearths, one or more of the top hearths being provided for first drying the material and lower hearths being provided for then incinerating material, means for feeding the material to be treated into the furnace onto the upper drying hearth, and means for rabbling the material over each succeeding hearth and from hearth to hearth down through the furnace, said rabbling means including a vertical rotatable shaft and a plurality of rabble arms extending from said shaft over each of said hearths, each of the drying hearths being provided with a larger number of rabble arms than said incinerating hearths whereby the material is more frequently rabbled on said drying hearths, said incinerating hearths of the furnace being formed with gas ports permitting gases arising from the material being incinerated to travel upwardly and over the succeeding incinerating hearths.

9. Apparatus for drying and burning sewage material or other waste products comprising a furnace having a plurality of superposed hearths, rotary rabbling means for periodically agitating and gradually advancing the material in succession over said hearths and down through the furnace, the material being dried on an upper hearth or hearths and burned on a lower hearth or hearths, said rabbling means including a rotating vertical shaft and a plurality of rabble arms extending from said shaft over each of said hearths, the drying hearth or hearths being provided with a larger number of rabble arms than the burning hearth or hearths, whereby the material is more frequently rabbled on the drying hearth or hearths.

10. Process of drying and incinerating waste material and destroying noxious odors evolved therefrom, which comprises gradually passing the material while agitating the same through a succession of superposed zones within a furnace, the material being passed downwardly from zone to zone, while being dried in an upper zone or zones and burned in a zone or zones below the upper zone, withdrawing vapor evolved from the material at the drying zone or zones and introducing such vapor into a lower heated portion of the furnace to heat such vapor to a temperature sufficient to substantially destroy the noxious odors thereof, then again withdrawing such vapor and passing the same while still at a high temperature into heat exchanging relationship with said vapor which is being introduced, to preheat the latter, to facilitate the maintaining of said temperature.

11. Process of drying and incinerating waste material and destroying noxious odors evolved therefrom, which comprises gradually passing the material while agitating the same through a succession of superposed drying and burning zones, the material being passed downwardly from zone to zone while being dried in an upper zone or zones and burned in a zone or zones below the upper zone, withdrawing vapor evolved from the material at the drying zone or zones, and conducting such vapor into and through a lower zone or zones wherein said vapor is heated in the presence of gaseous products of combustion evolved from the burning material to a temperature sufficient to substantially destroy noxious odors of the gas and vapor mixture, then withdrawing such mixture and passing the same while still at a high temperature into heat exchanging relationship with said vapor being conducted into said lower zone or zones to preheat said vapor and thereby facilitate the maintaining of said temperature.

12. Process of drying and incinerating waste material and destroying noxious odors evolved therefrom, which comprises gradually passing the material while agitating the same through a succession of superposed drying and burning zones, the material being passed downwardly from zone to zone, while being dried in an upper zone or zones and burned in a zone or zones below the upper zone, withdrawing hot vapor evolved from the drying material from said drying zone or zones, also withdrawing at a higher temperature gaseous products of combustion from a zone below the upper zone, then mixing said hot vapor and hot gaseous products at a point outside the path of travel of the waste material but at a temperature sufficient to substantially eliminate noxious odors of the mixture, and then recovering heat from the resulting hot mixture by bringing the same into heat exchanging relationship with vapor evolved from the drying material before such vapor is mixed with said withdrawn gaseous products.

13. Apparatus for drying waste material and destroying noxious odors evolved therefrom, which comprises a furnace having a plurality of superposed hearths, rotary rabbling means for periodically agitating and gradually advancing the material in succession over said hearths and down through the furnace, a heat exchanging device, means for withdrawing from an upper hearth, vapor evolved from the drying material, and passing such withdrawn vapor through said device to heat said vapor, means for then introducing said vapor into and through the lower portion of the furnace, means for heating said lower portion of the furnace to a temperature sufficient to substantially eliminate noxious odors of said vapor, and means for then conducting the resulting hot vapor through said device in heat exchanging relationship with the vapor being introduced into the lower portion of the furnace.

14. Apparatus for drying and burning waste material and destroying noxious odors evolved therefrom, which comprises a furnace having a plurality of superposed hearths surrounded and enclosed by a furnace wall, rotary rabbling means for periodically agitating and gradually advancing the material in succession over said hearths and downwardly from hearth to hearth, whereby the material is dried on an upper hearth or hearths and burned on lower hearths, means for withdrawing from a drying hearth, vapor evolved from the drying material, means for conducting said withdrawn vapor into a lower portion of the furnace and through such portion, means causing gases evolved from the burning material to flow through said portion while being mixed with said vapor at a high temperature, whereby noxious odors of such vapor are substantially destroyed, said portion of the furnace being substantially sealed at one of the hearths against the passage of gas or vapor from said portion into the upper regions of the furnace from which said vapor is withdrawn, a heat exchanging means associated with the furnace, and means for withdrawing the resulting hot gas and vapor mixture from the furnace through said heat exchanging means, for recovering heat of said mixture and restoring such heat to the furnace.

15. Apparatus for drying and burning waste material and destroying noxious odors evolved therefrom, which comprises a furnace having a plurality of superposed hearths surrounded and enclosed by a furnace wall, rotary rabbling means for periodically agitating and gradually advancing the material in succession over said hearths and downwardly from hearth to hearth, whereby the material is dried on an upper hearth or hearths and burned on lower hearths, means for withdrawing from a drying hearth, vapor evolved from the drying material, means for conveying hot gaseous products of combustion evolved from the burning material from a hearth below said drying hearth but spaced substantially from the bottom of the furnace, said furnace having a lower portion substantially sealed at one of the hearths against the passage of gas or vapor from said portion into the upper regions of the furnace from which said vapor is withdrawn, means for bringing said withdrawn vapor and gases into heat exchanging relationship and for then conveying said vapor into and through said lower portion of the furnace at a high temperature whereby noxious odors of such vapor are substantially destroyed.

FREDERICK B. SCHILLING.